United States Patent [19]

Foreman et al.

[11] Patent Number: 5,290,191

[45] Date of Patent: Mar. 1, 1994

[54] INTERFACE CONDITIONING INSERT WAFER

[76] Inventors: Kevin G. Foreman, 13 Tejano Canyon Rd., Sandia Park, N. Mex. 87047; Willie C. Kiser, 4572 Rockaway Loop, Rio Rancho, N. Mex. 87124; Karin J. Lovett, 2815 Tramway Cir., Albuquerque, N. Mex. 87122; Paul J. Miller, 1809 Newton Pl., NE., Albuquerque, N. Mex. 87106

[21] Appl. No.: 938,111

[22] Filed: Aug. 31, 1992

Related U.S. Application Data

[63] Continuation-in-part of Ser. No. 895,148, Jun. 5, 1992, Pat. No. 5,181,859, which is a continuation-in-part of Ser. No. 694,262, Apr. 29, 1991, abandoned.

[51] Int. Cl.$^5$ .................. H01R 13/02; H01R 13/68
[52] U.S. Cl. .................................. 439/225; 439/45; 439/95; 439/621; 439/927
[58] Field of Search ........................ 439/43–45, 439/49, 54, 65, 75, 95, 101, 225, 621, 890, 927

[56] References Cited

U.S. PATENT DOCUMENTS

| | | |
|---|---|---|
| T947,007 | 6/1975 | Krumreich et al. |
| 2,073,880 | 3/1937 | Robinson |
| 2,760,128 | 8/1956 | Colby |
| 2,944,330 | 7/1960 | Swick |
| 3,072,873 | 1/1963 | Traher |
| 3,500,194 | 3/1970 | Smith |
| 3,569,915 | 3/1971 | Langham et al. |
| 3,670,292 | 6/1972 | Tracy |
| 3,736,379 | 5/1973 | Kagan |
| 3,753,261 | 8/1973 | Thaxton |
| 3,825,874 | 7/1974 | Peverill |
| 3,852,700 | 12/1974 | Haws |
| 3,905,013 | 9/1975 | Lee |
| 4,002,397 | 1/1977 | Wang et al. |
| 4,056,299 | 11/1977 | Paige |
| 4,082,394 | 4/1978 | Gedney et al. |
| 4,326,765 | 4/1982 | Brancaleone |
| 4,362,350 | 12/1982 | von Harz |
| 4,407,552 | 10/1983 | Watanabe et al. |
| 4,415,218 | 11/1983 | McKenzie |
| 4,440,463 | 4/1984 | Gliha, Jr. et al. |
| 4,673,237 | 6/1987 | Wadsworth |
| 4,676,564 | 6/1987 | Mitchell, Jr. |
| 4,717,349 | 1/1988 | Johnson |
| 4,813,891 | 3/1989 | Walters et al. |
| 4,820,174 | 4/1989 | Farrar et al. |
| 4,846,705 | 7/1989 | Brunnenmeyer |
| 4,979,070 | 12/1990 | Bodkin |
| 4,979,904 | 12/1990 | Francis |
| 4,992,333 | 2/1991 | Hyatt |
| 5,092,788 | 3/1992 | Pristupa, Jr. et al. |
| 5,118,302 | 6/1992 | Fussell et al. |
| 5,134,252 | 7/1992 | Himeno et al. |

OTHER PUBLICATIONS

Hyatt, "A Technique for Optimizing ESD, EMP and Lightning Protection", pp. 393–408, date believed to be fall 1992.
Archer, "Heavy Duty Spike Protector".

*Primary Examiner*—Paula A. Bradley
*Attorney, Agent, or Firm*—G. Gregory Schivley; Robert W. Keller

[57] ABSTRACT

A wafer-like insert has a plurality of holes therein which correspond to pins of an electrical connector. The wafer includes contacts for making electrical connection to the pins, connector shell or electrical components. In such manner, the wafer can be used for a wide variety of purposes such as conditioning signals carried by the pins and grounding selected pin(s) to each other and/or the connector shell. The wafer can be installed in any common electrical connector pair without prior modification or preparation of the connectors and without impairing the normal fit or function of the mated connector pair.

26 Claims, 10 Drawing Sheets

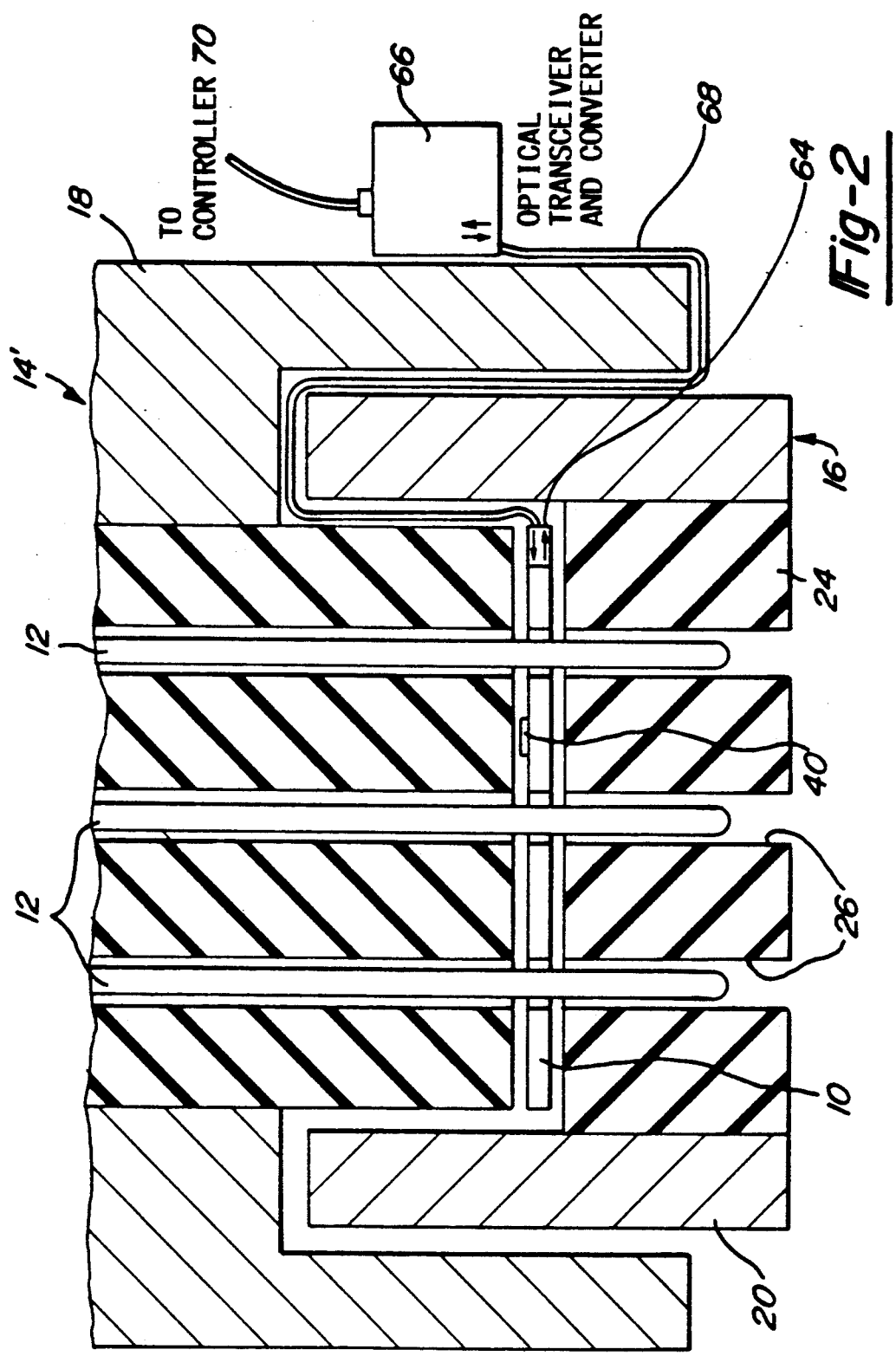

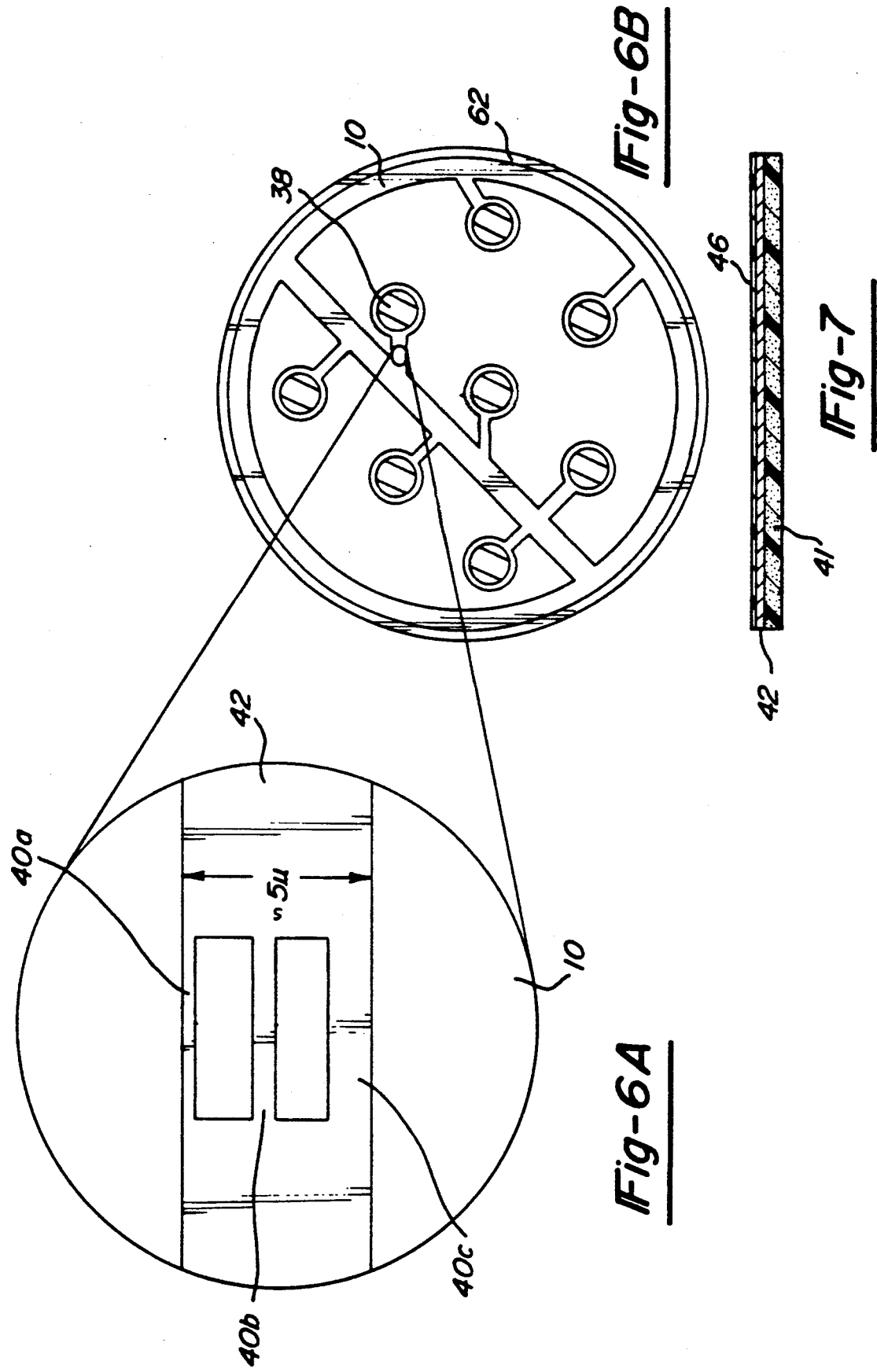

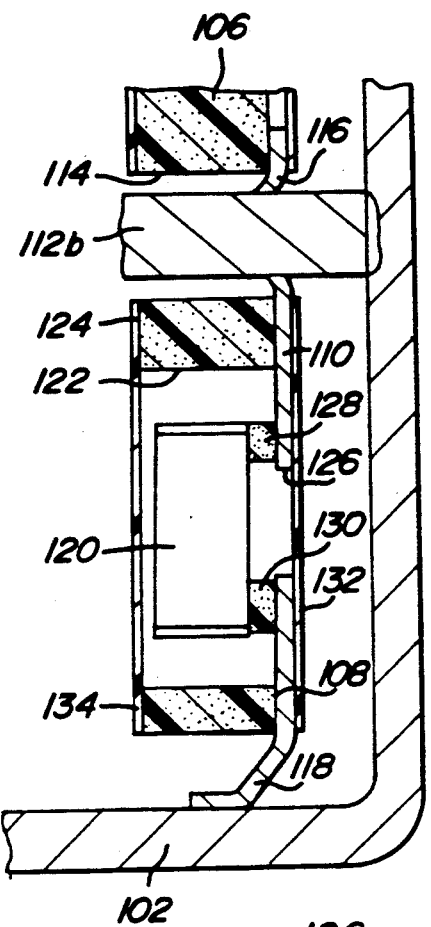
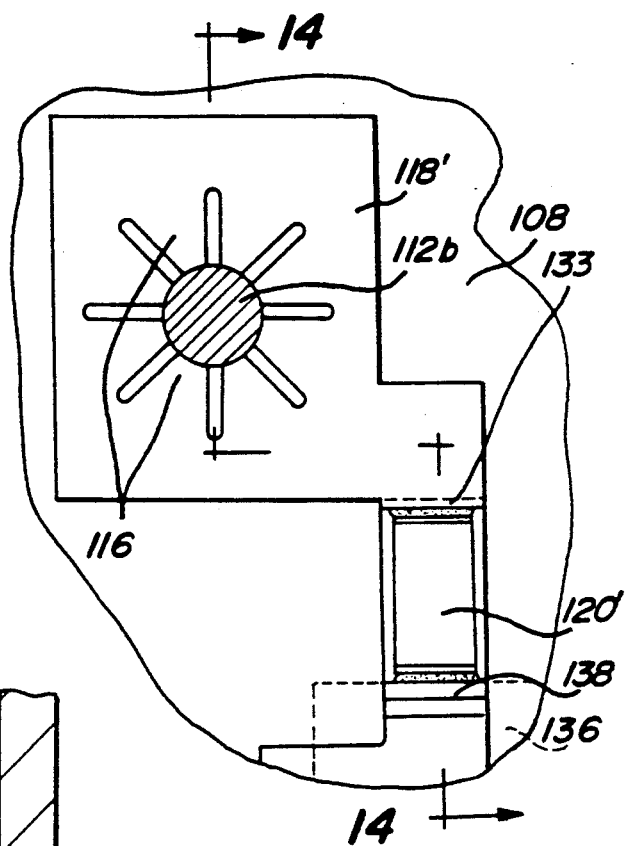
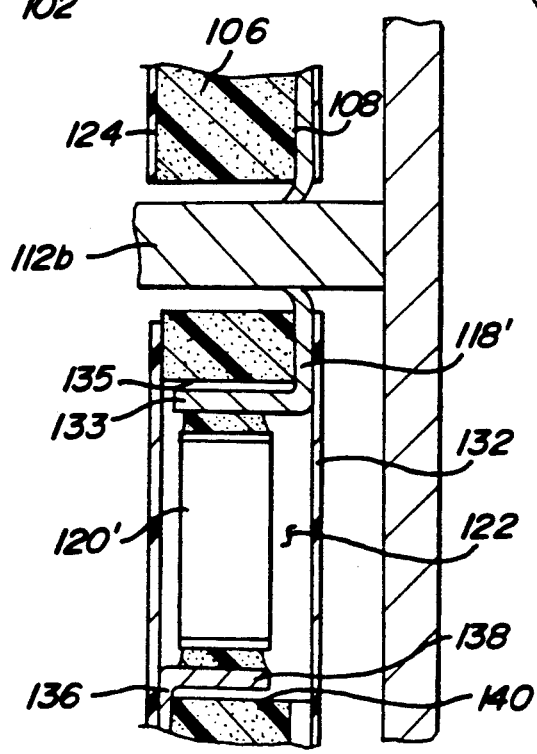
Fig-12
Fig-13
Fig-14

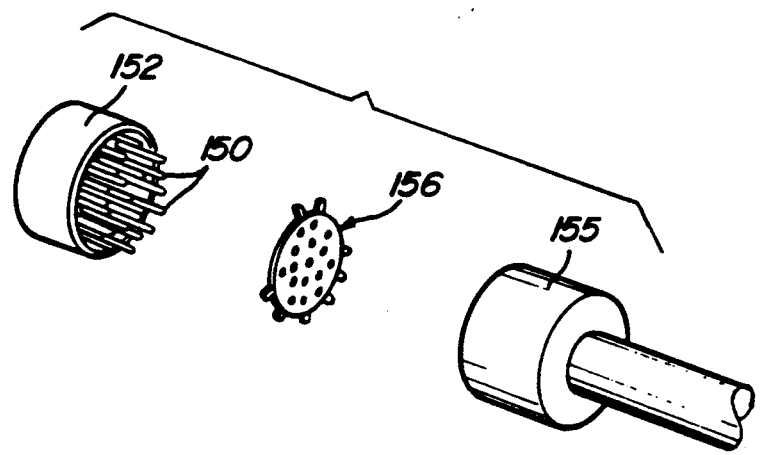
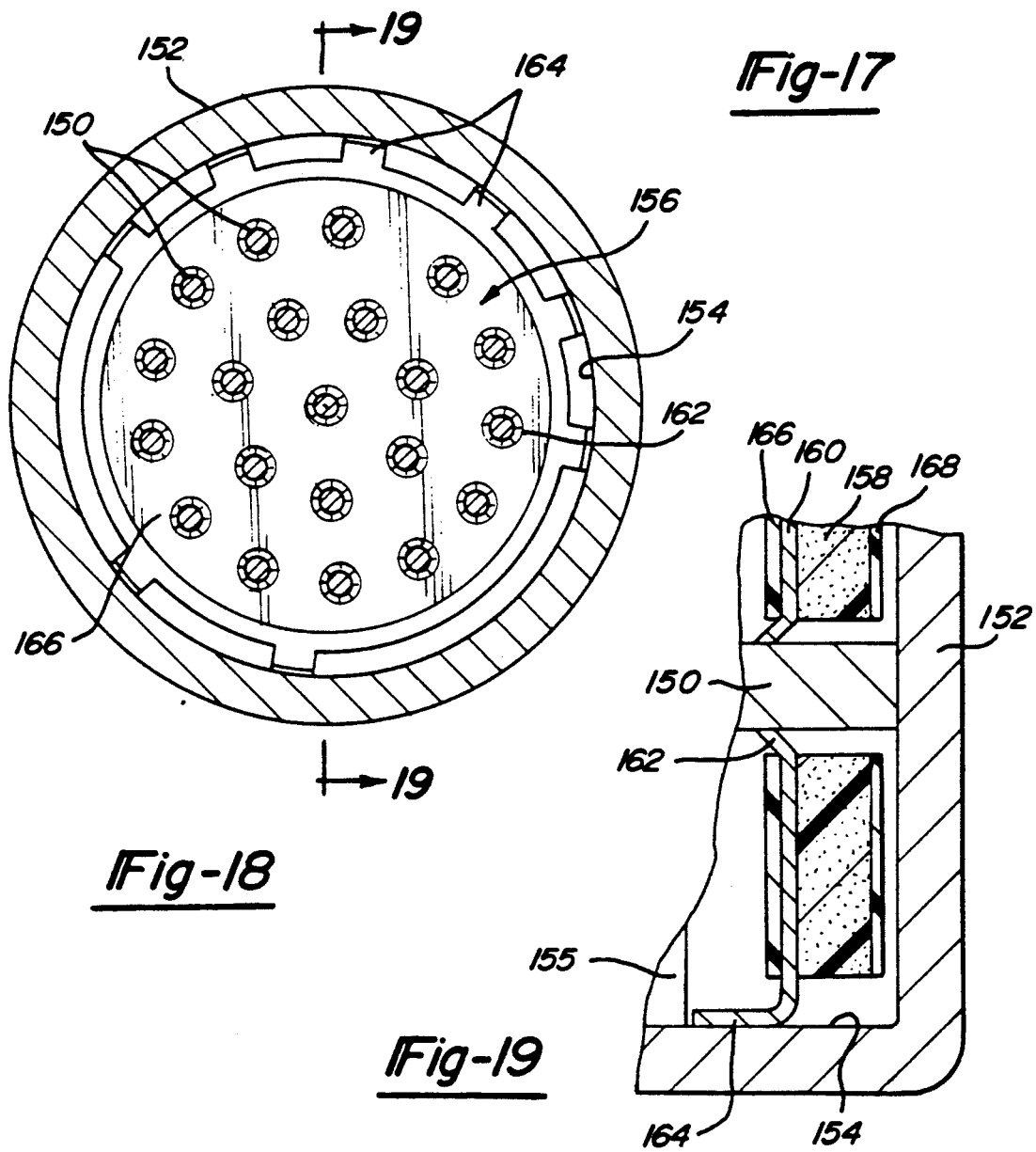

INTERFACE CONDITIONING INSERT WAFER

CROSS REFERENCE TO RELATED APPLICATIONS

This application is a continuation-in-part of U.S. Ser. No. 895,148 filed Jun. 5, 1992, now U.S. Pat. No. 5,181,859, which is a continuation of U.S. Ser. No. 694,262 filed Apr. 29, 1991, now abandoned.

BACKGROUND OF THE INVENTION

1. Technical Field

This invention relates to electronic components and, more particularly, to a device for making electrical connection to a plurality of pins in a male connector.

2. Discussion

Electrical cables are used in a variety of applications to transmit electrical signals from different sources to an equally wide variety of destinations. The cables generally include a plurality of individual wires which terminate at one end in either a male connector or a female connector. The male connector typically employs a series of pins which are housed in a shell that mate with sockets in the female connector.

Systems with cables often require conditioning and/or filtering of input signals in order to meet performance specifications or obtain certain input features. The physical implementation of this conditioning often requires installation of various electrical components between wires or between wires and ground at the input to an electrical circuit. For example, it is common practice to require capacitors or zener diodes at inputs between each wire and the system ground to reduce electromagnetic interference (EMI). Analogously, digital circuits often require "pull-up" resistors between some wires and ground or other wires at cable inputs and outputs.

Currently, such input conditioning is accomplished in several ways. The most common way is to include the extra components on the circuit card onto which the cable input terminates. This method consumes valuable circuit board space and often causes interface problems (e.g., it lets EMI onto the circuit card instead of stopping it at the cable input). In addition, this method makes it impractical to modify the input conditioning of existing hardware since the circuit card must be replaced, an expensive proposition. Another method to implement shunt input conditioning is to include the conditioning components in a specially designed cable connector as disclosed, for example, in U.S. Pat. Nos. 3,852,700 to Haws and 3,670,292 to Sorenson. This method is also expensive for retrofits and requires the use of nonstandard connector parts. Another way to accomplish input conditioning is to install a special circuit card with conditioning components between the cable termination and the system device- or circuit card. One embodiment of this method is to place the circuit card on the back side of a connector where the wires are soldered or crimped to the connector pins; this requires that the special circuit card be installed prior to assembling the wires to the connector, or that the connector be completely dissembled prior to installation. This method is also expensive for retrofits and takes up valuable space inside the system. None of these methods place the interface circuitry within the readily accessible gap between a standard unmodified pre-existing connector pair.

Thus, there is a need for an input conditioning method that does not alter the system circuit card, does not take up any valuable space in the system, and which can be easily, inexpensively and quickly retrofitted into existing systems. It is also envisioned that there exists a need to provide a relatively simple, yet reliable technique for easily coupling electrical circuits to the pins in such connectors. The electrical circuits could consist of active or passive electronic components, as well as more sophisticated microprocessors. Despite this need, it does not appear that the prior art has proposed an eloquently simple solution to the problem in the manner suggested by the present invention.

SUMMARY OF THE INVENTION

In accordance with the teachings of the present invention, a wafer is provided that has a series of holes in it that are aligned with the pins in a male connector. The wafer is inserted into the male connector so that the pins pass through the holes in the wafer. The wafer contains any of a wide variety of circuit means for performing preselected functions associated with the signals on the pins. The wafer further includes contact means for making electrical contact between the pins as they extend through the holes in the wafer and the circuit means. In such manner, electrical connection to the pins in the connector is easily and rapidly made, without requiring advance preparations of the host connector pair. The host connector pair is not specially designed nor modified to accept the wafer; rather the wafer is designed to fit any standard off-the-shelf connectors.

As will appear, the present invention has a wide variety of applications. For example, this invention creates a simple means of implementing input conditioning at a place that is normally inaccessible and in a space that is normally wasted—within the small space between mated electrical connectors. In one embodiment, a generic component mounting configuration allows virtually any input conditioning component to be inserted between pins or between pins and ground within the connector. For example, a capacitor array mounted on the wafer can provide capacitive filtering of any or all pins in the connector. A contact allows connection between pins and input conditioning components in the array. One end of the input conditioning components in the array are connected to a ground plane and terminated at the connector shell or are connected to another pin or pins, or both. Thus, signals passing through an electrical cable can be conditioned at the input connector simply by unmating the connectors, inserting the wafer and remating the connectors.

The wafer thickness, shape, surface treatment, number/size of pin holes, and number/size/shape of shell contact tabs are designed such that insertion of the wafer does not interfere with the normal mating or function of the host connectors. No modification of the host connectors or system is required. There is no change in the usual host wire path or electrical/mechanical continuity and the conditioning insert wafer fits entirely in a space that is normally wasted.

The invention causes minimal electrical and mechanical intrusion and minimum installation time compared to existing means. Once installed, the conditioning insert wafer is virtually nonintrusive; there is no observable change in the mechanical configuration of the host cable or host connectors and the electrical/RF characteristics of the system are not altered.

The input conditioning wafer has several other advantages. It can be totally passive; in order to function, it requires no batteries or electrical power. However, the device can use power from wires passing within the host connector if desirable for a specific application. Second, different input conditioning components can be placed on any desired pins within the connector, for example, capacitors on some pins, resistors on others and none on others. Third, the input conditioning insert wafer can be easily removed for upgrades, testing, or replacement.

BRIEF DESCRIPTION OF THE DRAWINGS

Still other advantages of the present invention will become apparent to those skilled in the art after a study of the specification and by reference to the drawings in which:

FIG. 2 is a cross-sectional view of one embodiment of the invention in which the wafer is sandwiched between mated male and female connectors;

FIGS. 6A-6B plan views illustrating one simple embodiment of the present invention. This embodiment shows a grounding wafer which fits within a military standard connector pair (MIL-C-38999) with an outer metal shell;

FIG. 7 is a side view of the wafer of FIG. 6;

FIG. 12 is a partial cross sectional view taken along the lines 12—12 of FIG. 11;

FIG. 13 is a partial top view illustrating another embodiment for mounting an electrical component to the wafer insert;

FIG. 14 is a partial cross sectional view taken along the lines 14—14 of FIG. 13;

FIG. 17 is an exploded perspective view of still another embodiment where the wafer is used to ground the connector pins;

FIG. 18 is a front view thereof, showing the wafer inserted in the male connector; and FIG. 19 is a cross-sectional view thereof, taken along the lines 19—19 of FIG. 18.

DESCRIPTION OF THE PREFERRED EMBODIMENTS

Figure 1A:
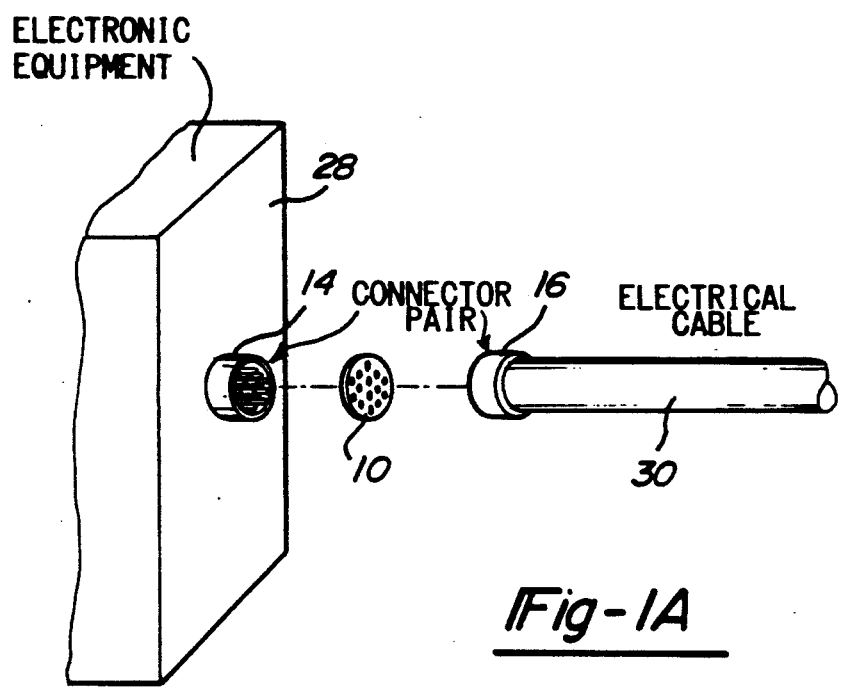
FIGS. 1A-1B exploded perspective views showing the installation of a wafer made in accordance with the teachings of the preferred embodiment of this invention.

It should be understood from the outset that the present invention will be described in connection with a few limited examples which illustrate the best mode of practicing the invention at the time that this application was filed. However, various modifications will become apparent to those skilled in the art after having the benefit of studying the text, drawings and claims which follow this detailed specification. With that caveat in mind, the attention of the reader should now be turned to the drawings, especially FIGS. 1A-1B.

In accordance with the teachings of this invention, a wafer 10 is provided for making electrical connection to the pins 12 of a male electrical connector 14. Male electrical connector 14 mates with a female connector 16 in a manner well known in the art. By way of a specific, although not limiting example, and as shown in more detail in FIGS. 2-3, the male/female connectors 14 and 16 are of the type meeting military specification MIL-C-38999. The male connector is characterized by a cylindrical metal outer shell 18 which is removably connected to a complementary metal shell 20 on the female connector 16. The removable connection is usually made by a bayonet or threaded coupling on the mating surfaces of the shells 18 and 20, although other such connections can also be made to ensure proper mating of the connectors.

The interior of the male connector includes a nonconductive plate 22 that maintains the orientation of the pins 12 and insulates them from the conductive shell 18. The female connector 16 likewise includes a nonconductive plate 24 and an array of sockets 26 for receiving the pins 12.

The male connector is shown in FIG. 1A as being coupled to electronic equipment 28. The female connector 16 is mounted on one end of an electrical cable 30. The cable contains a plurality of wires that carry electrical signals to and from the electronic equipment 28 when the connectors 14 and 16 are mated together.

In accordance with the teachings of this invention, the wafer 10 is removably inserted between the mated connectors 14 and 16. The wafer 10 has a diameter smaller than the inner diameter of the smallest connector shell and is thin enough to be inserted between the connector pair without interfering with the positive connection therebetween. For this example, a MIL-C-38999 connector pair, the maximum wafer thickness is 0.030" so as not to interfere with normal connector mate. As shown perhaps best in FIG. 3, wafer 10 includes two generally parallel major surfaces 32 and 34, along with a peripheral edge 36. A series of holes 38 are formed between the two major faces of the wafer. Holes 38 are aligned with and slightly larger than the diameter of pins 12.

Circuitry, generally designated by the numeral 40, is formed on the wafer 10 and is in electrical contact with one or more of the pins 12. The circuitry 40 can be any of a wide variety of devices such as active and passive electronic components, as well as more sophisticated microprocessing circuitry. The circuitry 40 is generally designed to perform preselected functions associated with the conditioning of the electrical signals on the pins 12. These functions include, but are not limited to, signal rerouting or grounding and interface protection using passive electronic components such as current/voltage monitors, transient limiters such as capacitive filters and point-to-point wiring. Active electronics such as analog and logic circuitry, matrix switches, power management devices and buffer amplifiers can be utilized to provide discrete event monitoring, integrated built-in test augmentation and diagnostics, signal processing, interface diagnostics and/or signal conditioning. Circuitry 40, on the other hand, may take the form of microprocessing circuitry such as the 68000 variety, and may include static RAM and ROM as well as non-volatile memory. In that event, the circuitry can provide discrete event recordation and decision based signal conditioning/diagnostics.

Circuitry 40 is shown in FIGS. 6A–6B, however, as consisting simply of a plurality of fuses 42(a, b, and c) which are formed by areas of reduced widths in a thin film metal layer 42 formed on surface 32 of wafer 10. The fuses 40(a, b and c) are connected to the pins and operate, in this example, to sense electromagnetic pulse induced stress on the pins 12. If, for example, a potentially damaging pulse is received exceeding a predetermined current level then one or more of the fuses will melt causing a change in resistance associated with that pin. The wafer, in this example, takes the form of a silicon substrate 41 and includes a passivation layer 46, as shown in FIG. 7. Instead of the circuitry 40 being a simple metal fuse formed on the wafer surface, conventional very large scale integration circuit techniques can be used to form active devices within the body of the semiconductor wafer.

Figure 4:
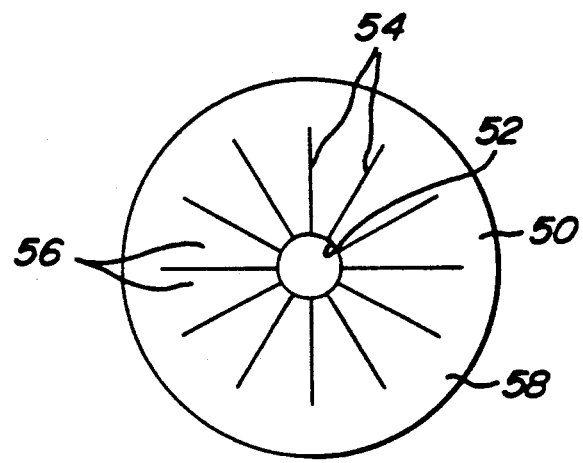
FIG. 4 is a plan view of a suitable contact configuration.
Figure 5:
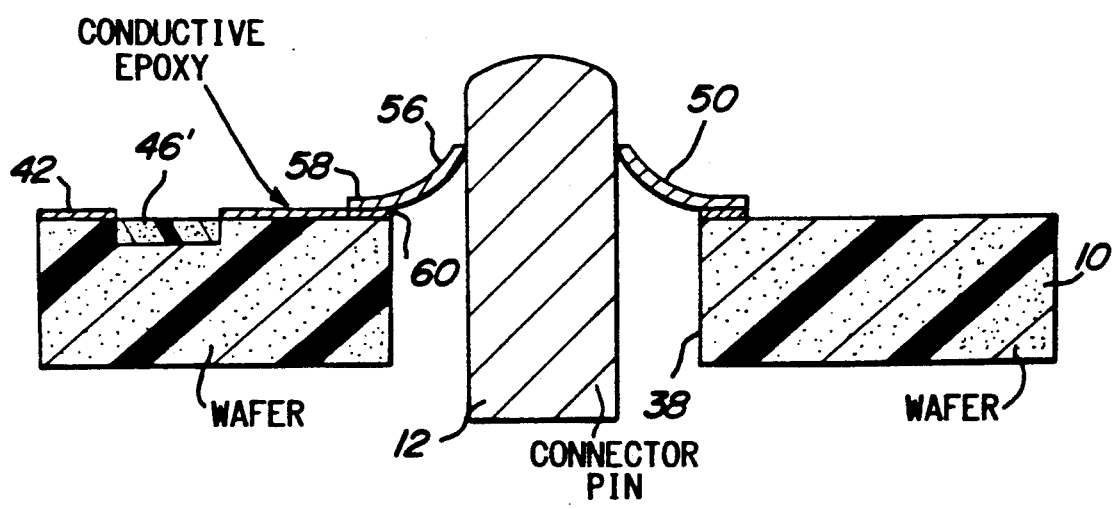
FIG. 5 is a partial side view showing the contact design in use.

In any event, some type of electrical connection is provided between the pins 12 and the circuitry 40. In this particular example, a metallic disc 50 is provided for each wafer hole 38. As shown best in FIGS. 3–5, each metallic disc 50 includes an aperture 52 whose diameter is slightly smaller than the cross sectional diameter of the connector pin 12. A plurality of radially extending slits 54 define an array of bendable fingers 56, the inner portions of which serve to bend under the force of the connector pin being inserted through the wafer holes 38 to thereby make a sliding, removable, yet positive electrical connection with each pin. The non-slitted peripheral rim 58 of the disc 50 is mounted by way of conductive epoxy or solder to conductive circular pads 60 on wafer 10 surrounding holes 38. The discs 50 are connected by way of metal traces 42 to the circuitry which, in FIG. 5, bears the reference numeral 46' to represent an active electronic integrated circuit component formed in the surface of semiconductor material serving as wafer 10.

Figure 3:
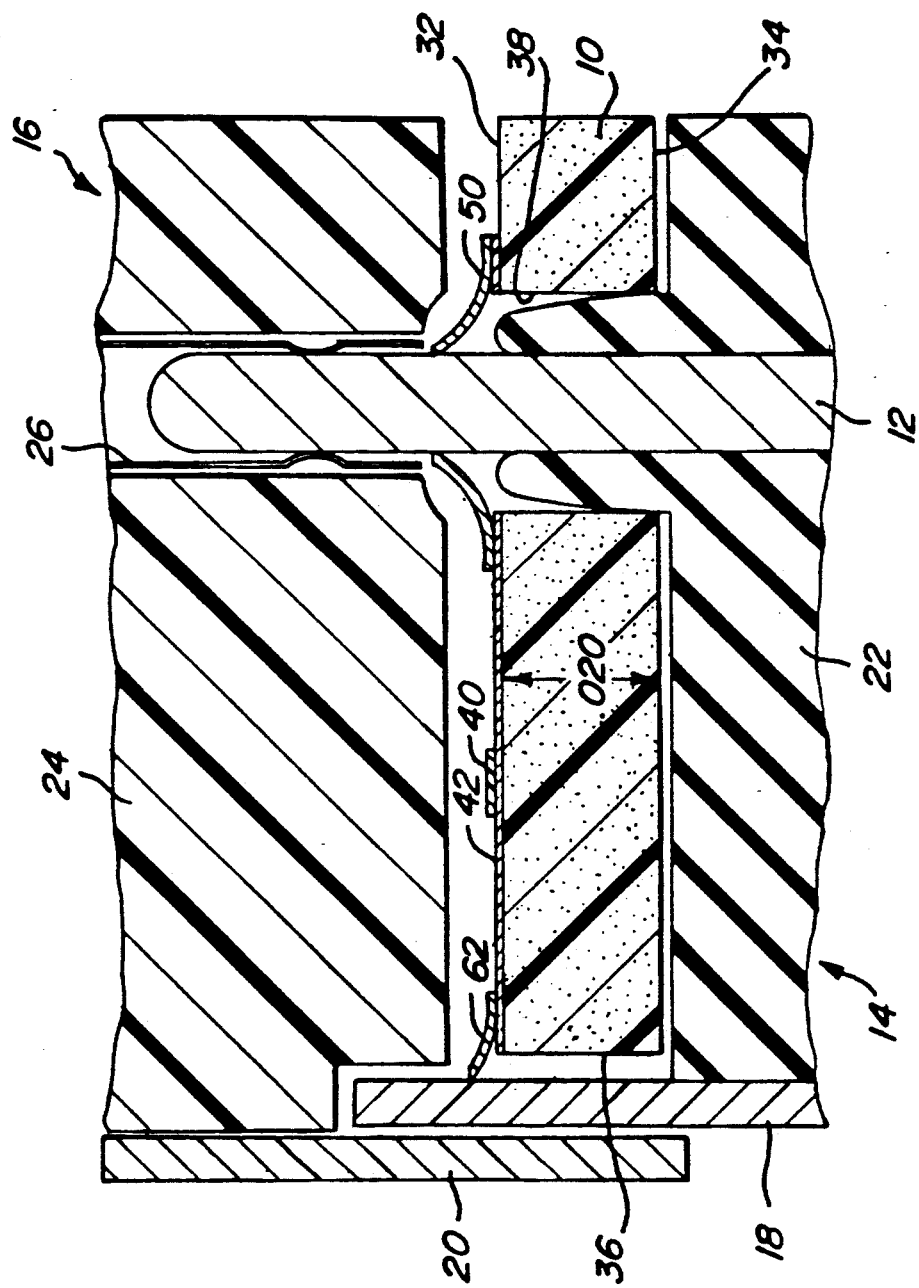
FIG. 3 is a partial cross-sectional view illustrating another embodiment and one technique for making electrical contact between the pins and the wafer.

In many applications it is necessary to make electrical connection to the innermost shell of the connector pair which often serves as an electrical ground. In such instances similar wiping electrically conductive fingers 62 can be used for this purpose, as seen in FIG. 3.

FIG. 2 illustrates a somewhat more sophisticated embodiment where bidirectional communication is made between the circuitry 40 on the wafer 10. In such manner, it is possible to expand the capabilities of the invention. As shown in FIG. 2, the wafer includes a suitable onboard optical transceiver 64 which communicates with a remote transceiver and converter 66 via a light waveguide 68. Transceiver and converter 66 is coupled to a suitable controller 70 which may be provided by way of a host computer. Electrical signals from the controller 70 are converted by transceiver/converter 66 into suitable light pulses which are transmitted by waveguide 68 to the transceiver 64 on wafer 10. The waveguide 68 can be made of suitable material that has sufficient flexibility and integrity to transmit the optical information in a reliable manner. It should be flexible enough so that it can conform with the relatively small pathways left between shells 20 and 18 of the mated connectors, as shown. Waveguide 68 can, for example, take the form of a Mylar strip which is preferably coated with a reflecting substance on its outer surfaces to increase the efficiency of the optical transmission.

Figure 1B:
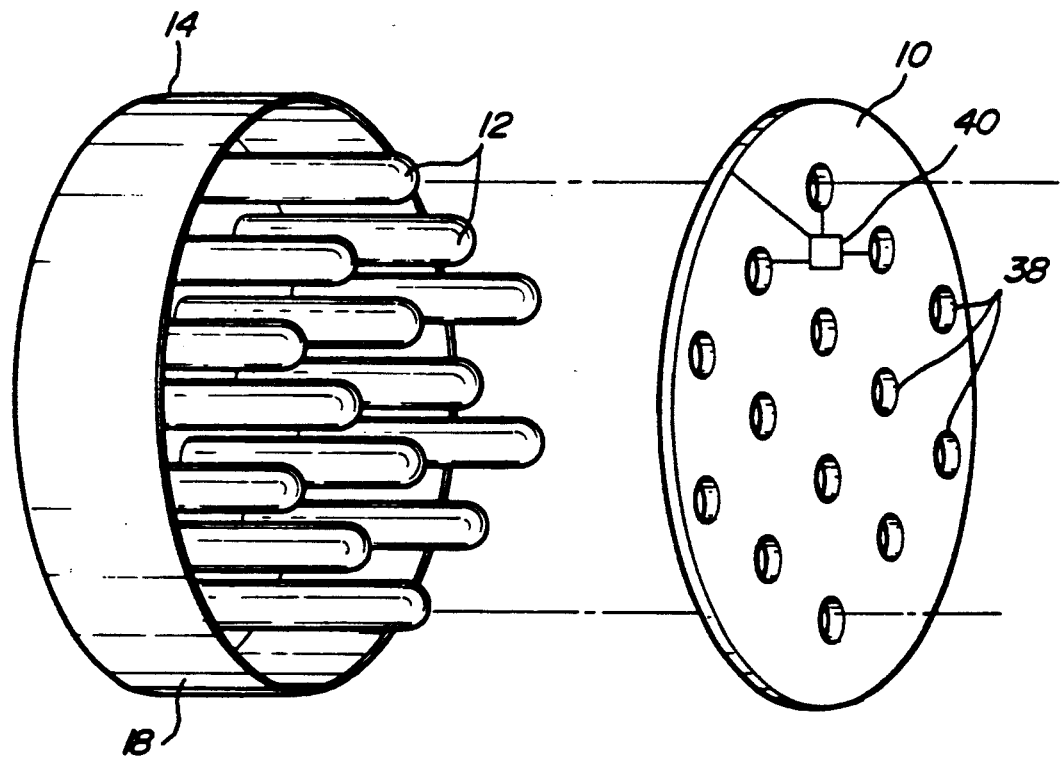

Optical transceiver 64 converts the optical signal from waveguide 68 into suitable electrical signals which are fed to the circuitry 40 on the wafer 10. For example, the signals could be used to program a suitable integrated circuit microprocessor which serves as the circuitry 40. The microprocessor then would communicate with the electronic equipment 28 via the pins 12 in the male connector 14 (FIGS. 1A–1B). Likewise, signals from the electronic equipment 28 can be communicated to the remote controller 70 via the pins 12, circuitry 40, optical transceiver 64, waveguide 68 and optical transceiver/converter 66. A system of this type can be used for a variety of applications such as advanced signal processing, intelligent instrumentation, real-time data stream monitoring, remotely controlled signal conditioning, switching and processing; remotely controlled interface diagnostics, transient data recordation and the like. Again, these applications are by way of non-limiting examples.

Figure 8:
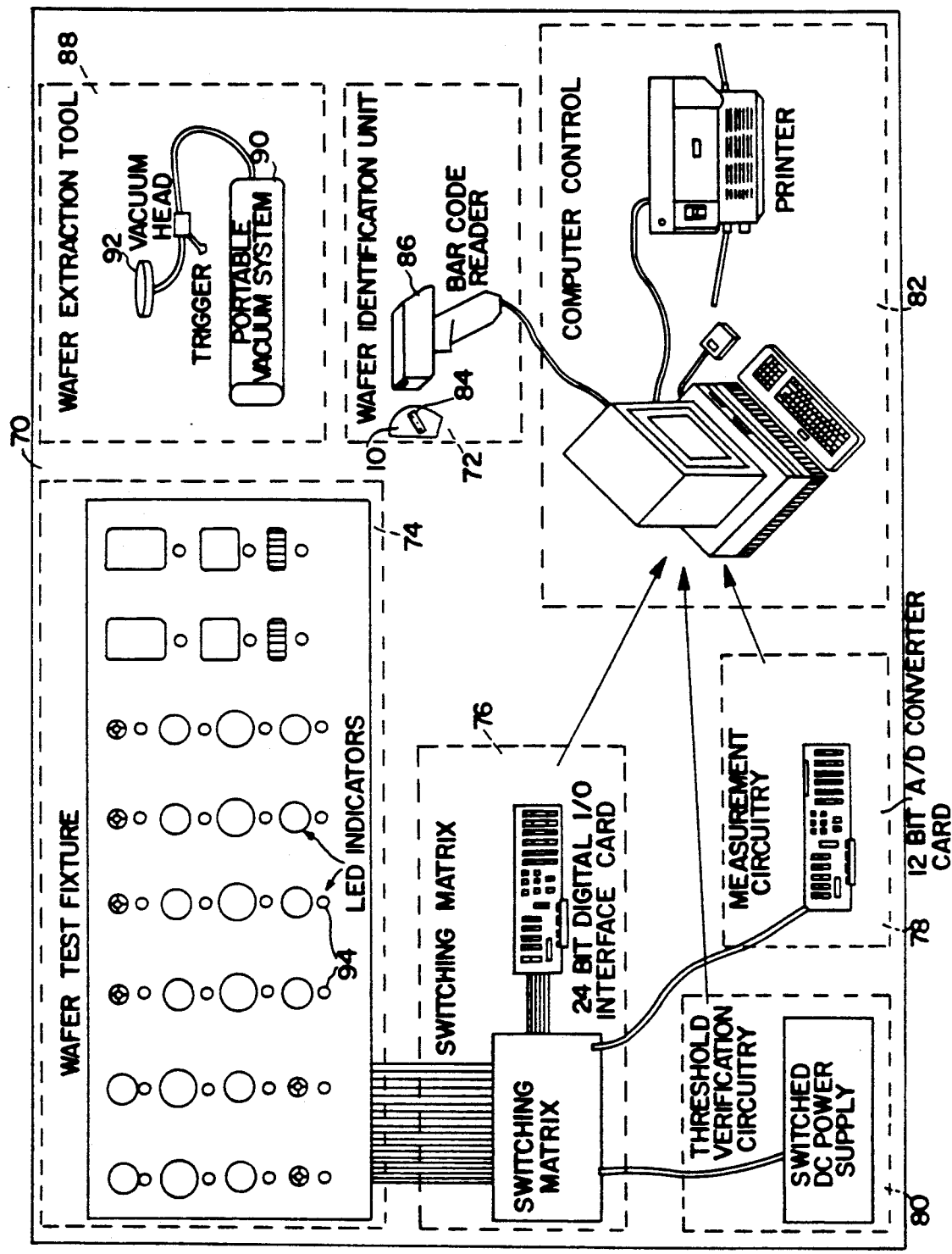
FIG. 8 is a block diagram view of a system which may be used to test the wafers.
Figure 9:
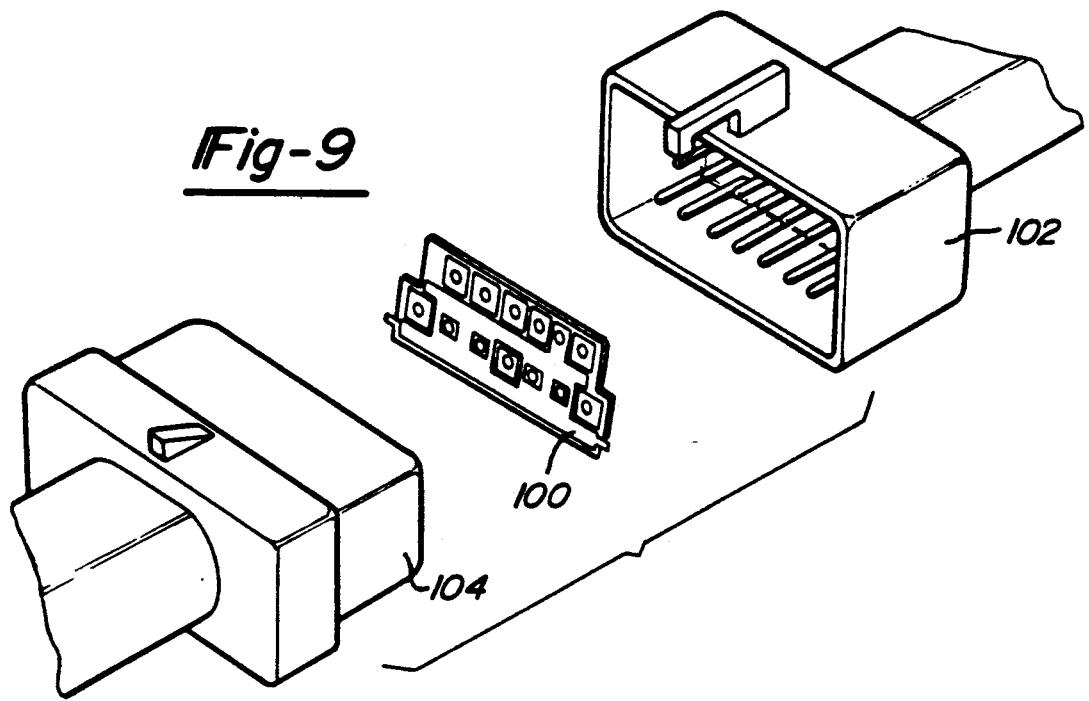
FIG. 9 is an exploded perspective view of another embodiment of the present invention which shows a common automotive connector pair.
Figure 10:
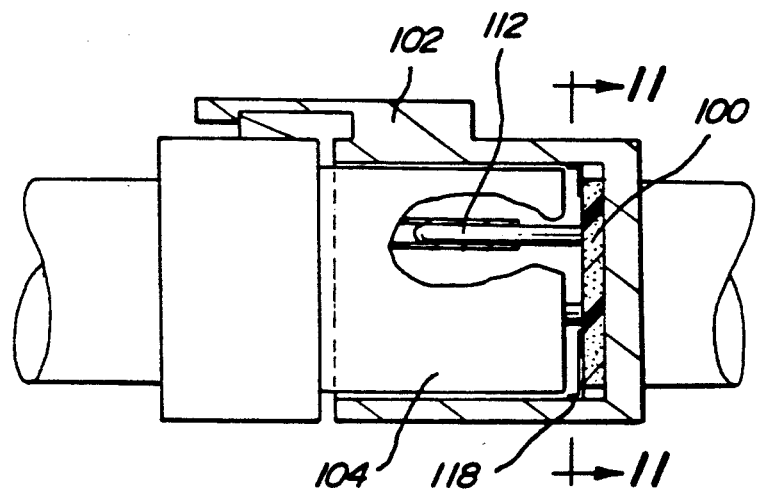
FIG. 10 is a cross sectional view showing the second embodiment in place between two assembled connectors.

Depending upon the application and type of circuitry on the wafer 10, it may be desirable to remove the wafer and test the circuitry thereon. For example, if the circuitry takes the form of the fuses shown in FIGS. 6A, 6B, and 7, it would be desirable to periodically remove and test the wafer to determine if any of the fuses 40(a, b, c) had melted due to high levels of electromagnetic induced current pulses on the pins 12. FIG. 8 illustrates a suitable test console 70 for this purpose. Console 70 includes a wafer identification unit 72, a wafer test fixture 74, a switching matrix 76, measurement circuitry 78, threshold verification circuitry 80 and computer control 82. The identification unit 72 uniquely identifies a wafer 10 by means of an identification tag 84 on each wafer 10. Tag 84, in this example, is a conventional bar code which can be read by a suitable bar code reader 86.

A wafer extraction tool 88 aids in the insertion and removal of the wafer into the connector 14 and minimizes the risk of wafer damage due to mechanical stress or other events. Tool 88 employs a vacuum system 90 with a vacuum head 92 designed to temporarily hold the wafer 10. During insertion, the head 92 manipulates the wafer so that the pins slide into the wafer holes 38 and make electrical connection to the pin contacts 50 and the shell contacts 62 make connection to the shell 18 (FIG. 3). The male and female connectors 14 and 16 are then mated together in the usual manner with the pins 12 being inserted into the female sockets 26. As illustrated in the drawings, the wafer 10 is sufficiently thin that it does not disturb the normal mating of the connectors. To remove the wafer 10, the connectors are disassembled and the vacuum tool 88 is used to extract the wafer 10 from the male connector 14.

The wafers then are placed in the test fixture 74 which generally consists of a bank of the same MIL-SPEC connectors 14. The test fixture 74 is capable of testing one wafer at a time by placing the wafer in its corresponding connector. An LED indicator 94 automatically locates the proper connector to use based on the wafer's identification code. The switching matrix 76 switches the resistance measurement between any pin on the connector and another pin or the connector shell. It also switches in an onboard switched DC power supply to verify the threshold of any of the fuses 40(a, b or c). The switching matrix 76 is controlled by the computer 82 through a bus interface card. The measurement circuitry 78 makes a resistance measurement that determines which fuses 40(a, b or c), if any, have been blown. An A/D converter with a fast sampling rate is used so that many fuses can be tested in a small amount of time. The threshold verification circuitry 80 includes a programmable switch DC power supply and a source resistant network. It creates a known square pulse with enough amplitude to blow any of the fuses. The pulse level is stepped up slowly and the fuse resistance is read after each pulse to determine when the fuse blows and what its threshold was. Computer control 82 controls all of the systems and records the data from the test. The computer is suitably programmed so that it will control all the testing procedure.

In the embodiment shown in FIGS. 9–12, the invention is illustrated in connection with an interface conditioning insert wafer 100 which performs multiple functions on the electrical signals. Insert wafer 100, however, has many of the same attributes as the previous embodiments. Namely, it is designed to fit unobtrusively between the male connector 102 and female connector 104 so that it can be easily inserted and removed without disturbing the normal positive connection between the connectors. Wafer 100 also contains all of its structural components and performs its preselected functions on the wafer itself and does not protrude outwardly from the mated connector pair.

In this embodiment, wafer 100 is formed from a rigid nonconductive dielectric substrate 106 approximately 0.015–0.030 inch thick. Major surface 108 contains a metal conductor pattern 110 which selectively routes signals from the male connector pins 112 to selected destinations and also serves as a ground plane. As shown most clearly in FIGS. 11–12, conductor pattern 110 terminates around selected holes 114 in a finger pattern 116 which makes electrical contact to some of the connector pins 112.

Figure 11:
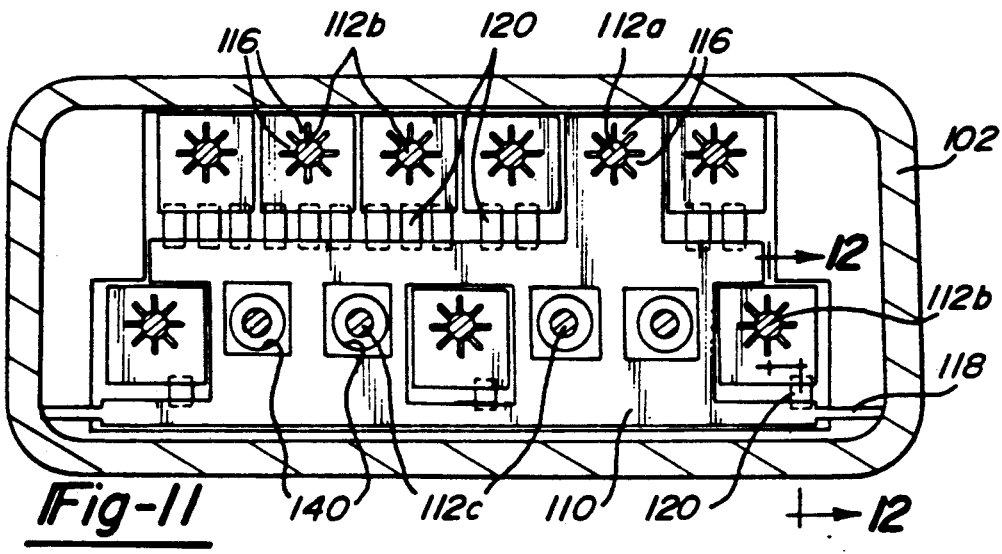
FIG. 11 is a view taken along the lines 11—11 of FIG. 10.

In FIG. 11, fingers 116 contact pin 112a and electrically ground the signal on that pin to the inner surface of the shell of connector 102 by way of bendable tabs 118 which wipe against the inner surface of the shell to make contact therewith. Pin 112a is thus directly coupled to ground. Other pins, however, are either electrically isolated or are routed through electrical components which are affixed to the wafer 100. For example, pins 112b are connected to one or more electrical components 120 and then to ground via tabs 118.

FIG. 12 illustrates one method of making the connection to the electrical component 120. A recess in the form of pocket 122 is formed in the substrate 106 between surfaces 108 and 124. The conductor pattern 110 extends into the pocket 122 and has a discontinuity or opening 126 therein which is smaller than the pocket 122. As a result, the conductor pattern forms a ledge for receiving and supporting component 120. Component 120, in this embodiment, is a capacitor chip which is soldered at 128 and 130 to bridge the opening 126. Accordingly, electrical signals on pin 112b are routed through component 120 and then to ground via tabs 118. If desired, protective insulating layers 132 and 134, such as adhesive-backed Kapton can be applied to the surfaces 108 and 124 of the wafer.

FIGS. 13 and 14 illustrate another technique for mounting the electrical component within the confines of the overall thickness of the substrate 106. In this example, the conductor pattern 118' has portion 133 which extends transverse to the plane of the wafer adjacent an inner wall 135 of the pocket 122. An additional conductor pattern 136 is applied to surface 124 of the wafer and it includes a conductive portion 138 adjacent an opposite wall 140 of the pocket 122. The electrical component 120' is soldered between conductive portions 133 and 138. In such manner the electrical signals are routed from pin 112b through the conductor pattern 118' on one surface of the wafer 106, through component 120' and then to the conductor pattern 136 on the opposite surface of the wafer.

In either mounting technique, it should be appreciated that the electrical component 120 is mounted so that it does not protrude outwardly from the major surfaces 108 or 124 of the substrate 106. Thus, the wafer 100 is kept as thin as possible and the components are protected from damage. By way of some non-limiting examples, electrical component 120 can be a memory storage device, integrated circuit capacitor, shorting block, pullup resistor, diode or other components which serve to perform preselected shunt conditioning and/or filtering of the input signals from the cable, or combinations thereof. For example, capacitors are used for electromagnetic interference filtering. Zener diodes can be used for clamping transients and spikes to protect sensitive system electronics, whereas pullup resistors can be used to condition the inputs and outputs of digital circuitry. In any event, the wafer 100 can be used for a wide variety of signal conditioning in an easy, inexpensive and quick manner to retrofit existing systems.

Figure 15:
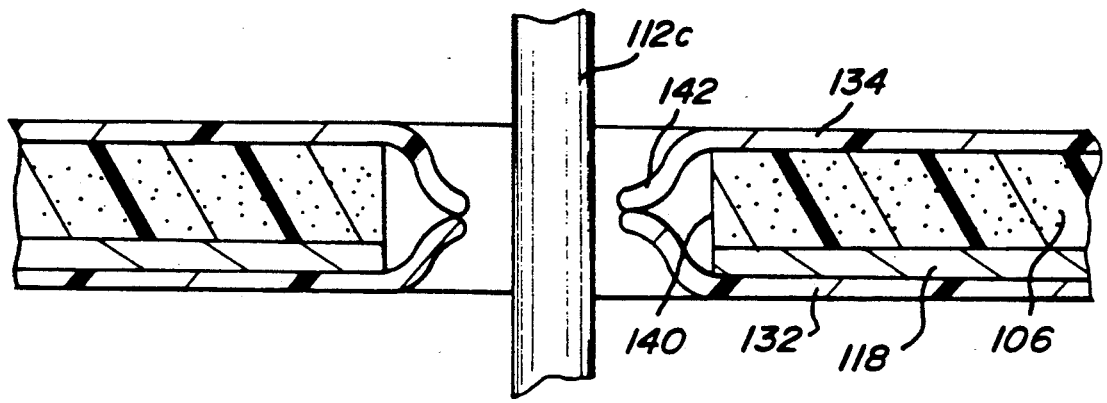
FIG. 15 is a partial cross section view showing one technique for insulating a connector pin from the wafer insert.
Figure 16:
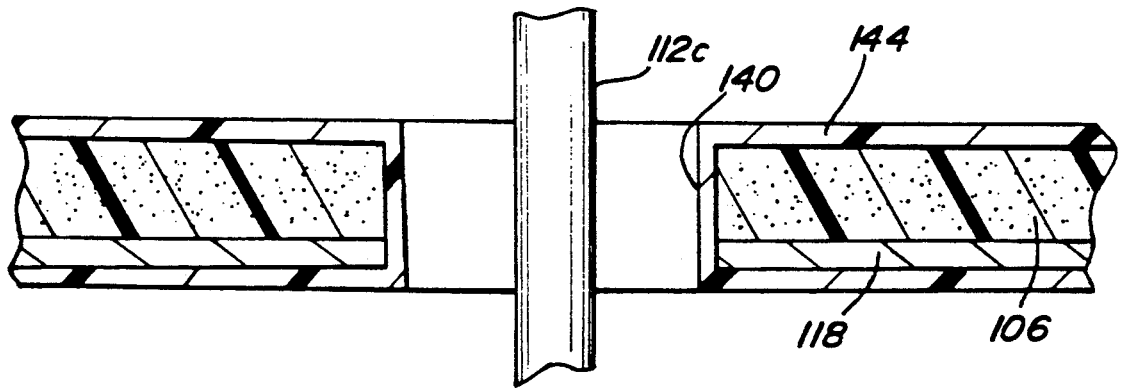
FIG. 16 is a partial cross section view similar to FIG. 15 but showing another technique for insulating the connector pin from the wafer insert.

In some instances it is not necessary to do any input conditioning on some of the pins in the electrical connectors. In this case, the pins 112c extend through holes in the wafer without making any electrical contact to the conductor pattern or components thereon. This is shown most clearly in FIGS. 11, 15 and 16. In FIG. 11 the conductor pattern 118 is terminated away from the holes 140 through which the pins 112c protrude. In FIG. 15, the edges of the insulating layers 132 and 134 are pinched together at 142 so as to insulate pin 112c from conductive pattern 118. In FIG. 16, the entire wafer is dipped in a protective and insulating coating 144 to likewise insulate the pin 112c.

By way of non-limiting examples, wafer 100 can be formed from a G-10 or FR-4 dielectric substrate. The metal conductive patterns can be made out of beryllium copper and the conductive connection to the electrical components 120 can be made with conductive epoxy, reflow solder and other techniques.

FIGS. 17–19 illustrate a simple embodiment of this invention wherein the circuit means is simply a connection between each of the pins 150 in the male connector 152 and the inner surface of the connector shell 154 which mates with female connector 155. In such manner the pins 150 are grounded to the shell. In this embodiment, the wafer 156 serves as a grounding plane for the pins 150. Wafer 156 is useful as a low impedance connection between any of the selected pins and other pins, and the connector shell, as is often required to provide electromagnetic interference (EMI) protection. The pins may either be ground wires or the outer conductor of a miniature coaxial pin as may be required by the existing connector design. Wafer 156, in this example, takes the form of a dielectric substrate 158 and a conductive ground plane 160 adhered to the top surface of the substrate. Ground plane 160 is etched so as to form the inner finger contacts 162 for the pins and the outer bendable ears 164 which make contact with the connector shell 154. The top surface of the conductive ground plane 160, between contacts 162 and ears 164, is preferably covered with an optional insulating layer 166. The other surface of substrate 158 may also be provided with a similar insulating layer 168.

It should be understood that while the foregoing embodiments were described in connection with connectors whose shells are metallic, the invention has applicability to non-metallic connectors such as plastic connectors found in home, automotive or other uses. In such cases the shell grounding contacts would obviously not be required. Signal conditioning would therefore occur from pin to pin and not to the shell. Additionally, if it is not desired to ground all of the pins in the embodiment of FIGS. 17-19, then the ground plane 160 can be etched so that the finger contacts 162 are omitted in those areas where pin grounding is not desired.

From the foregoing, those skilled in the art should realize that the present invention provides a simple, yet reliable way to rapidly and unintrusively make electrical connection to pins in electrical connectors and which further enables the user to modify or add a wide variety of functions through the use of the appropriate circuitry on the wafer. As noted from the outset, the invention has been described in connection with a few particular examples. However, various modifications and other applications will become apparent to the skilled practitioner after having the benefit of studying the specification, drawings and following claims.

What is claimed is:

1. A device for use with a wide variety of unmodified off-the-shelf electrical connectors, said device being removably insertable within the confines of a shell of a male connector having a plurality of pins which mate with sockets in a female connector, said device comprising:
a wafer having upper and lower major surfaces, the wafer being sufficiently thin so as to fit between the male and female connectors while permitting mating engagement therebetween, with the perimeter of the wafer being substantially entirely located within the perimeter of the shells of the connectors;
said wafer having a series of holes therein aligned with the pins in the male connector, said wafer being insertable into the male connector so that the pins extend through the holes;
contact means for making electrical contact with at least one of the pins as they extend through the holes in the wafer;
electrically conductive means on at least one surface of the wafer for providing an electrical conductive path between the contact means and other pins or the periphery of the wafer, for providing an electrical connection between at least one of the pins of the male connector and other pins therein or the shell of the male connector; and
whereby the wafer is inserted into the shell of the male connector to provide conditioning of signals on the pins thereof when mated with the female receptacle.

2. The device of claim 1 wherein the wafer is selected from the group of dielectric substrates and semiconductor material.

3. The device of claim 1 which further comprises:
electrical component means affixed to the wafer and electrically connected to the contact means for performing a preselected function on the electrical signals carried by the male connector pins.

4. The device of claim 3 wherein the electrical component means is selected from the group of capacitors, diodes, shorting blocks, resistors, analog and digital components, integrated circuits, fuses, memory storage devices and combinations thereof.

5. The device of claim 3 wherein said electrical component is located in a recess in the wafer to minimize the thickness thereof.

6. The device of claim 5 wherein said recess is a pocket formed between the major surfaces of the wafer, and wherein the electrical component is located in the pocket substantially between the major surfaces of the wafer.

7. The device of claim 6 wherein said conductive means is an electrical conductor pattern on one surface of the wafer which extends into the pocket to form a ledge onto which the electrical component is supported and electrically connected thereto.

8. The device of claim 6 wherein a first electrically conductive pattern on one surface of the wafer extends from the contact means into a side wall portion of the pocket, and wherein a second electrically conductive pattern on an opposite surface of the wafer extends into an opposite side wall portion in the pocket, with the electrical component being connected to the first and second electrically conductive patterns.

9. The device of claim 3 wherein selected pins are connected by the electrically conductive means directly to the shell of the male connector to thereby ground them, while other pins are connected to the electrical component.

10. The device of claim 9 wherein other pins are electrically isolated from the conductive means on the wafer thereby preventing conditioning of signals thereon.

11. The device of claim 1 which further comprises:
an insulating layer on at least one surface of the wafer.

12. The device of claim 11 wherein the insulating layer extends around sidewalls of the holes through which at least some of the pins extend thereby isolating them from the electrical conductive means on the wafer.

13. A method of conditioning signals flowing between pins in a male connector that are mated with sockets in a female connector, said method comprising:
disconnecting the male connector from the female connector;
providing a wafer having a series of holes therein corresponding to the pins in the male connector;
inserting the wafer into the male connector so that the pins extend through the holes in the wafer;
using an electrically conductive pattern on the wafer to make electrical contact between at least one pin and a shell of the male connector or another pin of the male connector;
reconnecting the male and female connectors, with the wafer lying therebetween; and
conditioning electrical signals flowing through the pins as the male and female connectors are mated by using the electrically conductive pattern on the wafer or additional electrical components on the water.

14. The method of claim 13 wherein the electrical components are located between major surfaces of the wafer to thereby minimize its thickness.

15. A device for use with a wide variety of unmodified off-the-shelf electrical connectors, said device being removably insertable onto a male connector having a plurality of pins which mate with sockets in a female connector, said device comprising:
- a wafer having upper and lower major surfaces with a pocket formed therebetween, the wafer being sufficiently thin so as to fit between the male and female connectors while permitting mating engagement therebetween;
- said wafer having a series of holes therein aligned with the pins in the male connector, said wafer being insertable onto the male connector so that the pins extend through the holes;
- contact means for making electrical contact with at least one of the pins as they extend through the holes in the wafer;
- electrical component means substantially located in the pocket formed between the major surfaces of the wafer and electrically connected to the contact means for performing a preselected function on the electrical signals carried by the male connector pins;
- an electrical conductor pattern on at least one surface of the wafer and extending into the pocket to form a ledge onto which the electrical component means is supported and electrically connected thereto for providing an electrical conductive path between the contact means and the other pins or the periphery of the wafer, for providing an electrical connection between at least one of the pins of the male connector and other pins therein; and
- whereby the wafer is inserted onto the male connector to provide conditioning of signals on the pins thereof mated with the female receptacle.

16. The device of claim 15 wherein the perimeter of the wafer is substantially entirely located within the perimeter of a shell of the male connector.

17. The device of claim 15 wherein the electrical component means is selected from the group of capacitors, diodes, shorting blocks, resistors, analog and digital components, integrated circuits, fuses, memory storage devices and combinations thereof.

18. The device of claim 15 wherein the electrical component means is a capacitor chip which provides electromagnetic interference filtering for the signals on the pins.

19. A device for use with a wide variety of unmodified off-the-shelf electrical connectors, said device being removably insertable onto a male connector having a plurality of pins which mate with sockets in a female connector, said device comprising:
- a wafer having upper and lower major surfaces with a pocket formed therebetween, the wafer being sufficiently thin so as to fit between the male and female connectors while permitting mating engagement therebetween;
- said wafer having a series of holes therein aligned with the pins in the male connector, said wafer being insertable onto the male connector so that the pins extend through the holes;
- contact means for making electrical contact with at least one of the pins as they extend through the holes in the wafer;
- electrical component means substantially located in the pocket formed between the major surfaces of the wafer and electrically connected to the contact means for performing a preselected function on the electrical signals carried by the male connector pins;
- a first electrically conductive pattern on one surface of the wafer extending from the contact means into a sidewall portion of the pocket and a second electrically conductive pattern on an opposite surface of the wafer extending into an opposite sidewall portion in the pocket, with the electrical component means being connected to the first and the second electrically conductive patterns, the first and the second electrically conductive patterns provide an electrical conductive path between the contact means and other pins or the periphery of the wafer or between at least one of the pins of the male connector and other pins therein;
- whereby the wafer is inserted onto the male connector to provide conditioning of signals on the pins thereof when mated with the female receptacle.

20. The device of claim 19 wherein the perimeter of the wafer is substantially entirely located within the perimeter of a shell of the male connector.

21. The device of claim 19 wherein the electrical component means is selected from the group of capacitors, diodes, shorting blocks, resistors, analog and digital components, integrated circuits, fuses, memory storage devices and combinations thereof.

22. The device of claim 19 wherein the electrical component means is a capacitor chip which provides electromagnetic interference filtering for the signals on the pins.

23. A device for use with a wide variety of unmodified off-the-shelf electrical connectors, said device being removably insertable onto a male connector having a plurality of pins which mate with sockets in a female connector, said device comprising:
- a wafer having upper and lower major surfaces, the wafer being made of a dielectric substrate that is sufficiently thin so as to fit between the male and female connectors while permitting mating engagement therebetween;
- said wafer having a series of holes therein aligned with the pins in the male connector, said wafer being insertable to the male connectors so that the pins extend through the holes;
- contact means for making electrical contact with at least one of the pins as they extend through the holes in the wafer;
- electrically conductive means on at least one surface of the wafer for providing an electrical conductive path between the contact means and a shell of the male connector to thereby ground the pins, said electrical conductive means being formed from a metallic pattern having a plurality of ears extending from the periphery of the wafer for making connection to the shell;
- an insulating layer on at least one surface of the wafer; and
- whereby the wafer is inserted onto the male connector to provide a grounding plane for the pins thereof when mated with the female receptacle.

24. The device of claim 23 wherein the perimeter of the wafer is substantially entirely located within the perimeter of a shell of the male connector.

25. A device for use with a wide variety of electrical connectors, said device being removably insertable onto a male connector having a plurality of pins which mate with sockets in a female connector, said device comprising:
- a wafer having upper and lower major surfaces, the wafer being sufficiently thin so as to fit between the male and female connectors while permitting mating engagement therebetween;
- said wafer having a series of holes therein aligned with the pins in the male connector, said wafer being insertable onto the male connector so that the pins extend through the holes;
- contact means for making electrical contact with at least one of the pins as they extend through the holes in the wafer;
- electrically conductive means on at least one surface of the wafer for providing an electrical conductive path between the contact means and the other pins or the periphery of the wafer, for providing an electrical connection between at least one of the pins of the male connector and other pins therein; and
- whereby the wafer is inserted onto the male connector to provide conditioning of signals on the pins thereof mated with the female receptacle.

26. The device of claim 25 which further comprises:
- electrical component means affixed to the wafer and electrically connected to the contact means for performing a preselected function on the electrical signals carried by the male connector pins.

* * * * *